W. FAUCKBONER, Jr.
UMBRELLA-SUPPORT.
No. 173,606. Patented Feb. 15, 1876.
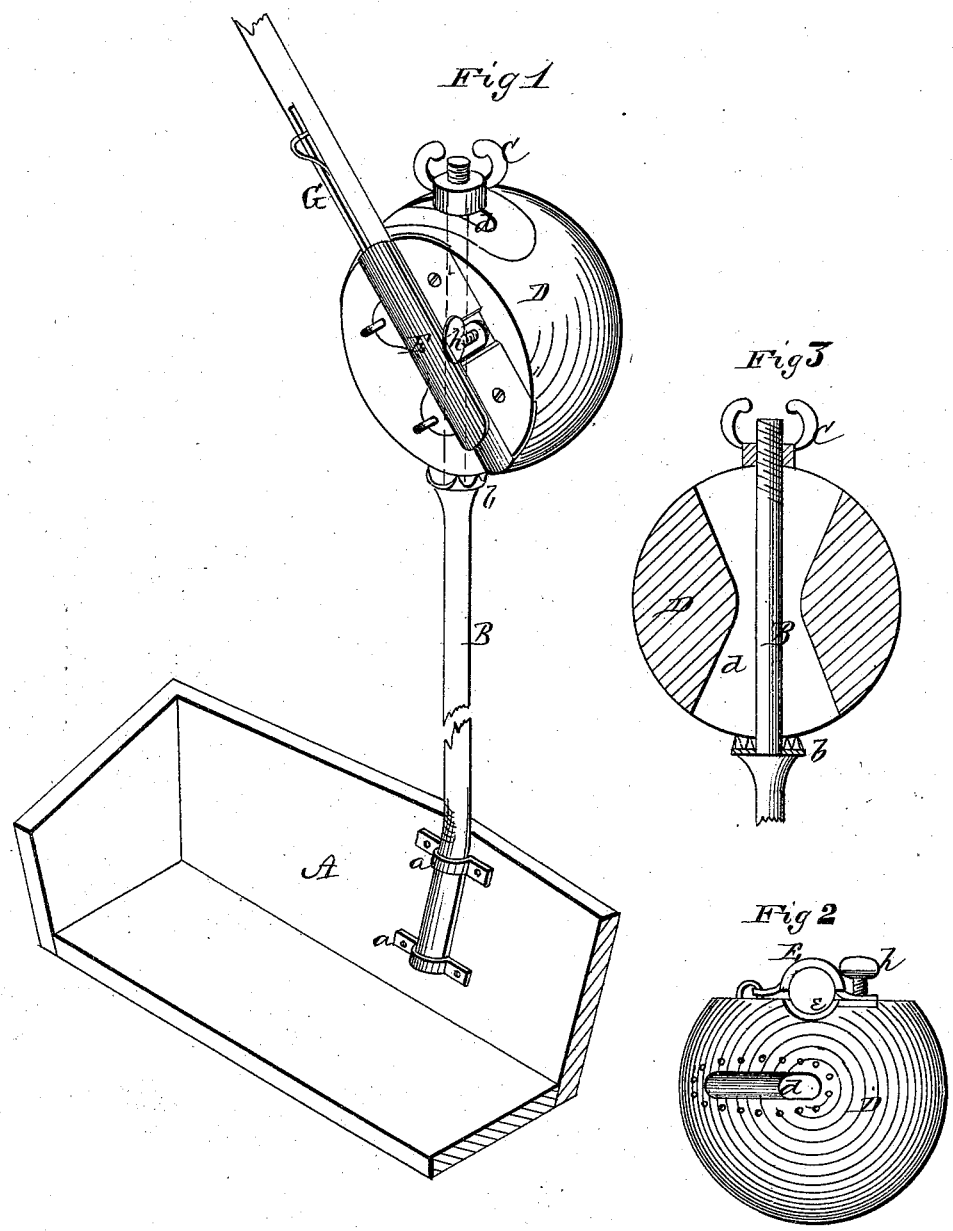
WITNESSES
Franck L. Durand
A. L. Evert
INVENTOR
Wm Fauckboner Jr.
By Alexander Mason
Attorneys

UNITED STATES PATENT OFFICE.

WILLIAM FAUCKBONER, JR., OF SCHOOLCRAFT, MICHIGAN.

IMPROVEMENT IN UMBRELLA-SUPPORTS.

Specification forming part of Letters Patent No. 173,606, dated February 15, 1876; application filed August 14, 1875.

*To all whom it may concern:*

Be it known that I, WILLIAM FAUCKBONER, Jr., of Schoolcraft, in the county of Kalamazoo and in the State of Michigan, have invented certain new and useful Improvements in Umbrella-Holders; and do hereby declare that the following is a full, clear, and exact description thereof, reference being had to the accompanying drawings, and to the letters of reference marked thereon, making a part of this specification.

The nature of my invention consists in the construction and arrangement of an umbrella-holder for vehicles, as will be hereinafter more fully set forth.

In the annexed drawing, Figure 1 is a perspective view of my invention. Fig. 2 is a plan view of the holder proper, and Fig. 3 is a section of the same.

A represents a seat for a vehicle, provided on the front of its back rest with staples $a$ $a$, for the insertion of the lower end of a standard, B, supporting the umbrella-holder, which can thus easily and quickly be changed from one vehicle to another when desired.

The standard B is provided with a pronged or toothed collar, $b$, a suitable distance below its upper end.

D represents a ball, having an angular slot, $d$, made through it, substantially of the form shown in Fig. 3. The upper end of the standard B is passed through this slot, and the ball held by means of a thumb-nut, C, screwed upon the upper end of the standard, which thumb-nut forces the under side of the ball on the pronged or toothed collar $b$, thereby holding it firmly in position.

One side of the ball D is cut off flat, and in this side is formed a semi-tubular recess or socket, $e$, in which the umbrella-handle G is laid, said handle being then held in position by a clasp, E, fastened over the handle by set-screws $h$ $h$.

By loosening the nut C and raising the ball D up, the ball can be moved, so as to have the umbrella at any angle from a perpendicular to thirty degrees of a horizontal, at the same time giving it a rotary motion, so as to turn the umbrella in any direction of the compass desired.

By means of the nut C and toothed collar $b$, it can be set at any point desired. By loosening the set-screws $h$, the umbrella can be moved up and down and set at any point, thus making it adjustable in all its parts.

Having thus fully described my invention, what I claim as new, and desire to secure by Letters Patent, is—

1. In an umbrella-holder, the combination of the standard B, having toothed collar $b$, the ball D, having angular slot $d$, and the set-screw C, substantially as and for the purposes set forth.

2. The combination of the adjustable ball D, with semi-tubular socket or recess $e$, hinged clasp E, and set-screws $h$, for the purposes set forth.

3. The combination, with a vehicle-seat, A, of the staples $a$ $a$, standard B, adjustable ball D, and holder E $e$, substantially as and for the purposes set forth.

In testimony that I claim the foregoing I have hereunto set my hand this 5th day of July, 1875.

WM. FAUCKBONER, JR.

Witnesses:
M. R. COBB,
C. C. DYCKMAN.